United States Patent [19]

Maggio

[11] 4,316,598

[45] Feb. 23, 1982

[54] BALANCED RELIEF VALVE WITH NOVEL SEAL

[75] Inventor: Robert L. Maggio, Elmhurst, Ill.

[73] Assignee: Vapor Corporation, Chicago, Ill.

[21] Appl. No.: 172,399

[22] Filed: Jul. 25, 1980

[51] Int. Cl.³ ............................................ F16K 31/122
[52] U.S. Cl. .................................... 251/63; 251/361; 251/364; 137/492
[58] Field of Search ............ 137/488, 489, 492, 492.5; 251/361, 362, DIG. 1, 360, 364

[56] References Cited

U.S. PATENT DOCUMENTS

| | | | |
|---|---|---|---|
| 2,616,653 | 11/1952 | Tarr | 251/DIG. 1 |
| 2,655,936 | 10/1953 | Wexler | 251/DIG. 1 |
| 3,951,381 | 3/1976 | Whitener | 251/DIG. 1 |
| 4,132,386 | 1/1979 | Lee | 251/DIG. 1 |
| 4,192,483 | 3/1980 | Combes | 251/DIG. 1 |
| 4,245,663 | 1/1981 | Solowy | 137/492 |

FOREIGN PATENT DOCUMENTS

| | | | |
|---|---|---|---|
| 714339 | 7/1965 | Canada | 251/DIG. 1 |
| 983178 | 2/1965 | United Kingdom | 251/DIG. 1 |

*Primary Examiner*—Alan Cohan
*Attorney, Agent, or Firm*—Francis J. Lidd

[57] ABSTRACT

A pilot operated pressure relief valve for use on medium and high pressure vessels, conduits, and the like. A two-stage, non-flowing pilot valve operates a main relief valve of substantially greater capacity. In a preferred embodiment the main valve is mounted directly onto the pressure vessel which is to be vented at a predetermined pressure. The pilot is preferably mounted closely adjacent to the main valve for operating communication therewith. An improved main valve seal is provided which allows the use of commonly available seal configurations in a simple and easily assembled construction to provide a fast operating, high pressure seal.

4 Claims, 4 Drawing Figures

BALANCED RELIEF VALVE WITH NOVEL SEAL

BACKGROUND OF THE INVENTION

This invention relates generally to pressure operated relief valves and more particularly concerns a novel pressure seal for a balanced pressure relief valve. In particular, the seal disclosed provides improved relief valve operation by preventing simmering of the valve and leakage.

Heretofore it has been difficult if not impossible to utilize conventional seals such as "O" rings in piston shut-off valve constructions where one end of the closure member and seat are in abutting relationship. With this type of "face" seal, in high pressure service, rapid movement of the closure member away from the seat results in a 90° change in vented product flow subjecting the seal to substantial aerodynamic forces. These forces tend to lift the seal from its retaining groove resulting in either damage to the seal and impaired subsequent operation, or complete removal of the seal and failure of the valve. These forces also impinge abrasive particles against the seal resulting in damage to and eventual destruction of the seal.

Conventional solutions to seal retention under these conditions usually involve use of seals having cross-sections which can be mechanically retained by positive locking devices such as screws, rivets, or other means. These valves, therefore, in addition to requiring specially manufactured seals are somewhat dificult to maintain since seal replacement has become complex.

The method of main or relief valve seal retention disclosed in this application allows the use of a commonly available "O" ring in a configuration which effectively eliminates the aerodynamic forces tending to lift the "O" ring from its sealing position during valve operation.

Prior art relief and/or valve combinations are disclosed in U.S. Pat. Nos. 3,595,263, 3,664,362, 3,512,560 and 3,568,706; however, prior art attempts at using face seals between the piston and the sealing seat in these valves have not been successful due to removal of the seal material by the turbulence of the fluid flow during valve operation. This deterioration or destruction of the seal results in leakage and valve simmering.

Accordingly, in order to prolong the service life of valves employed to relieve excess pressure in large, high pressure vessels, it is desirable to provide a sealing member that is not subject to abrasion from the flowing media and is not custom molded.

SUMMARY OF THE INVENTION

A pilot operated pressure relief valve is described that employs mechanically independent first and second pressure operated stages. In a preferred embodiment, the two-stage pilot valve operates a substantially larger main valve by venting the main valve head volume. The design of the main valve closure is in pressure equilibrium with the tank or pressure vessel; however, when the head volume is vented to atmosphere, the tank pressure is utilized to open the main valve providing the desired pressure relief. An additional signal to the pilot valve is provided by a down stream venturi or ram tube which provides an indication of true tank pressure allowing the pilot and main valve to reset at a correct tank pressure independent of the magnitude of main valve flow. A remote pressure pick up may also be employed.

A feature of the two-stage pilot valve disclosed utilizes a specific storage volume to control the rate of change of actuating product flow, to be vented by the main valve, between the first and second stages and is disclosed more completely in United States patent application Ser. No. 943,377, filed Sept. 18, 1978, incorporated by reference herein. These controlled rates of operation provide positive and more accurate relief and blowdown operations of both the pilot and main valve.

A main or relief valve seal defined in the seat of the main valve is also disclosed that utilizes vent apertures in predetermined locations adjacent to a seal retention groove, providing effective relief of pressure differentials and resistance to aerodynamic forces acting on the seal at the time of valve operation. This allows utilizing commonly available seals which can easily be replaced resulting in substantially reduced cost and effort of valve maintenance. Also, the probability of malfunction of the main or pressure relief valve is greatly reduced. A further technical description can be obtained by review of the bulletin included herewith as an Appendix.

BRIEF DESCRIPTION OF THE DRAWINGS

Other objects and advantages of the invention will become apparent when reading the following detailed description upon reference to the drawings, in which.

While the invention will be described in connection with a preferred seal and retention groove, it should be understood that it is not intended to limit the invention to the configuration disclosed. On the contrary, it is intended to cover all alternatives, modifications, and equivalances which may be included within the spirit and scope of the invention and as defined by the appended claims.

DETAILED DESCRIPTION OF THE INVENTION

Figure 1:
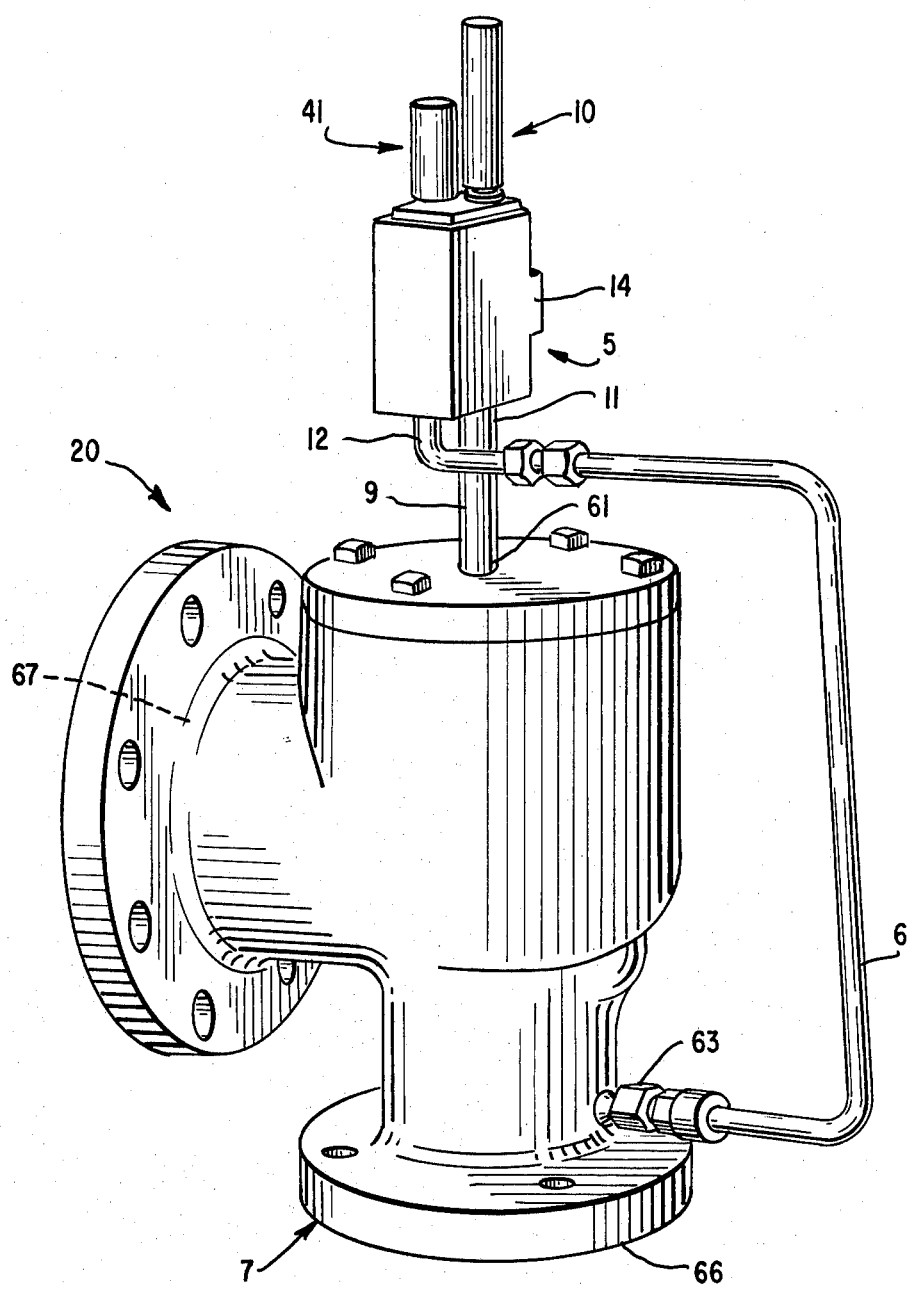
FIG. 1 is a semi-pictorial view of a pilot operated relief valve in a preferred but not exclusive embodiment, wherein the two-stage pilot valve is mounted closely adjacent to the main valve.
Figure 2:
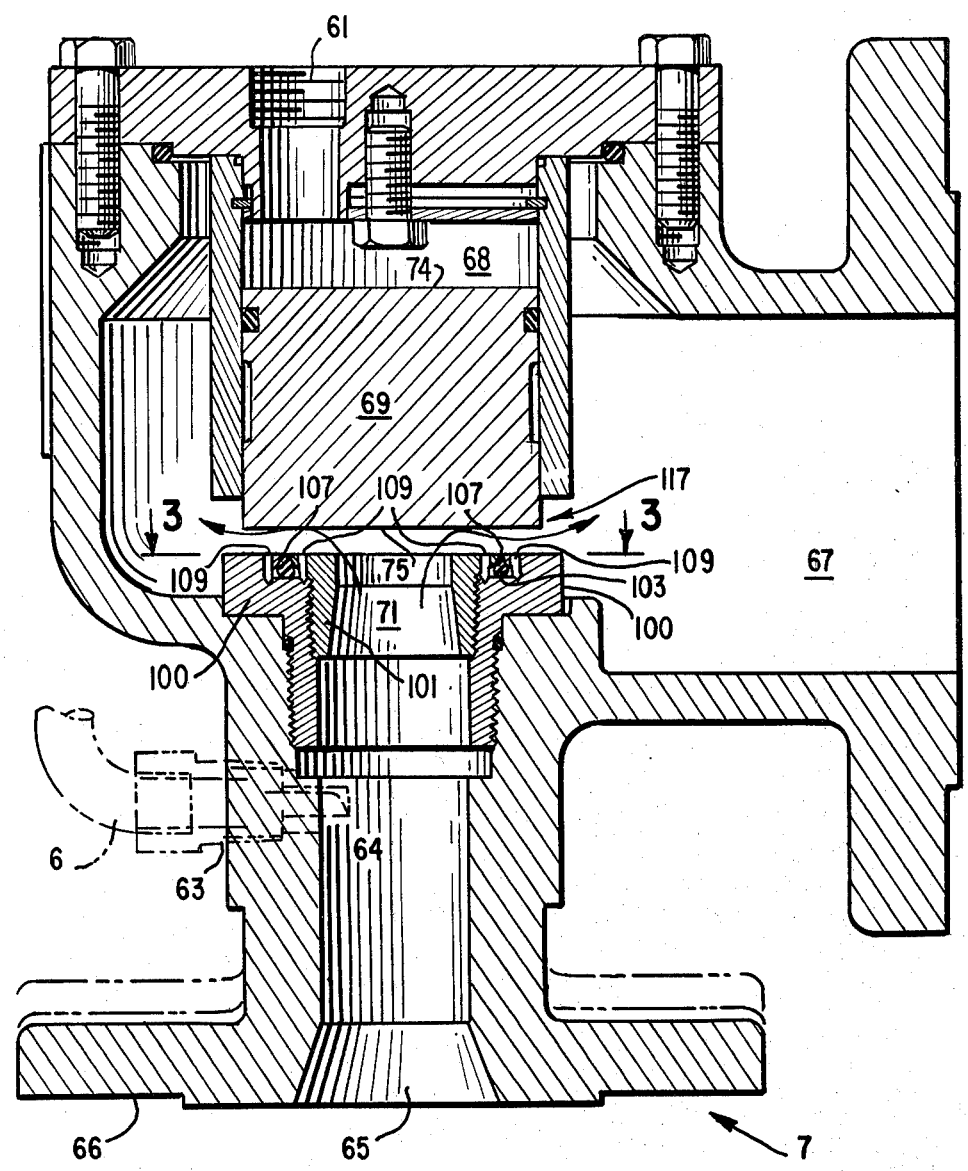
FIG. 2 is a sectional view of the main valve portion of the invention in the valve open position including the novel seal and pilot valve connecting tube.
Figure 3:
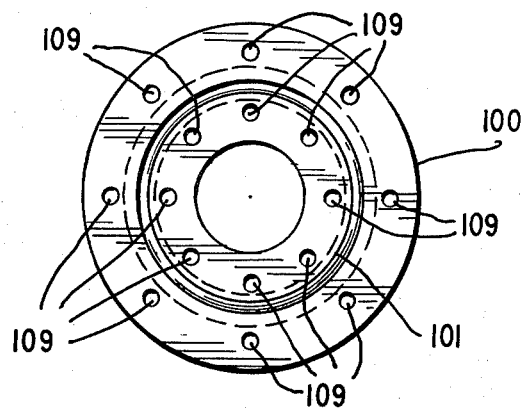
FIG. 3 is a view taken along line 3—3 in FIG. 2.

In reference to FIGS. 1 and 2, the pressure operated relief valve 20 disclosed herein consists of a pilot valve generally shown as 5 (re. FIG. 1), having a first stage 10 and a second stage generally shown as 41 contained in a body 14. In a preferred embodiment the pilot is mounted closely adjacent to the upper end of a main valve 7 communicating with the pilot 5 through main valve port 61 and port 11 of the pilot valve 5. In the disclosed embodiment a pipe or conduit 9 connects 61 and 11. Additionally, there is an inner-connecting external pressure tube 6 further communicating with a pressure tap 63 contained in the lower portion of the main valve 7 just above the main valve inlet flange 66 and inlet port 65. The pressure tap 63 communicates with a total pressure pilot ram tube 64, providing a tank pressure signal during main valve flow. Typically, the lower flange 66 of the main valve communicates with a pressure vessel, or conduit. Operation of the pressure operated relief valve therefore vents the product contained in the above mentioned pressure vessel or conduit.

In operation, assuming that tank pressure is below the relief setting of valve 20, as shown in FIGS. 1 and 2, static pressure from the associated vessel or conduit is applied to the main valve piston through the port 65 and the pilot valve through port 12 and tube 6, as discussed above. Pressure is therefore communicated internal to the pilot valve to the first 10 and second stage 41 elements.

The design of the pilot valve 5 and the stages 10 and 41 is best described in United States Patent application Ser. No. 943,377 mentioned previously. Accordingly, a detailed description will not be herein provided and the emphasis will be in describing the main valve and the seal assembly.

Tank pressure is sensed through the main valve inlet 65, and the pressure setting of the pilot valve first stage is determined by the force preload of a compression spring contained in the pilot valve first stage setting the first 10 and second 41 stages of the pilot valve 5 into operation.

After operation of the first 10 and second 41 stages, total pressure of the vented tank or conduit is now supplied to the ram or pilot tube 64 located in the relief inlet at 63, and communicates this pressure through the tube 6 and port 12, thereby maintaining the second stage pilot 41 in a depressed or relief position.

Returning now to the main or relief valve 7; operation of the novel seal retention device during the relief action initiated by the operation of first and second stages, 10 and 41, of the relief valve disclosed will be described.

As stated above, when the two pilot stages 10 and 41 are in a flow configuration shown and the main valve inlet 65 communicates with a vessel or conduit to be relieved, product pressure enters the main valve through the inlet 65 and is exerted through product transfer to the lower portion of the main valve piston 69 and acts through port 71 on main valve lower piston active area 75. Similarly, product pressure is transmitted via port 63, tube 6, inlet port 12, and pilot internal ports to the pilot valve port 11 which, in turn, communicates with main valve inlet port 61 to apply product pressure to the main valve head volume 68 and associated main valve upper head area 74. Since area 74 is greater than 75, the relief valve is held in the closed position compressing the main valve seal 103 that may, in the preferred embodiment, be an O-ring.

On operation of the pilot valve 5 providing product flow, the main valve head volume 68 is vented to the atmosphere via the flow path 61, 11, and the pilot internal ports exiting through second stage port.

As a consequence of the venting of main valve head volume 68, piston 69 rises rapidly and product flow passes through the main valve orifice 71 and main valve exit 67.

At this point product flow through 71, is directed against the lower face 75 of the piston 69 and then radially when passing through the main valve cylinder port 117, and redirected to exit the main valve exit port 67.

Figure 4:
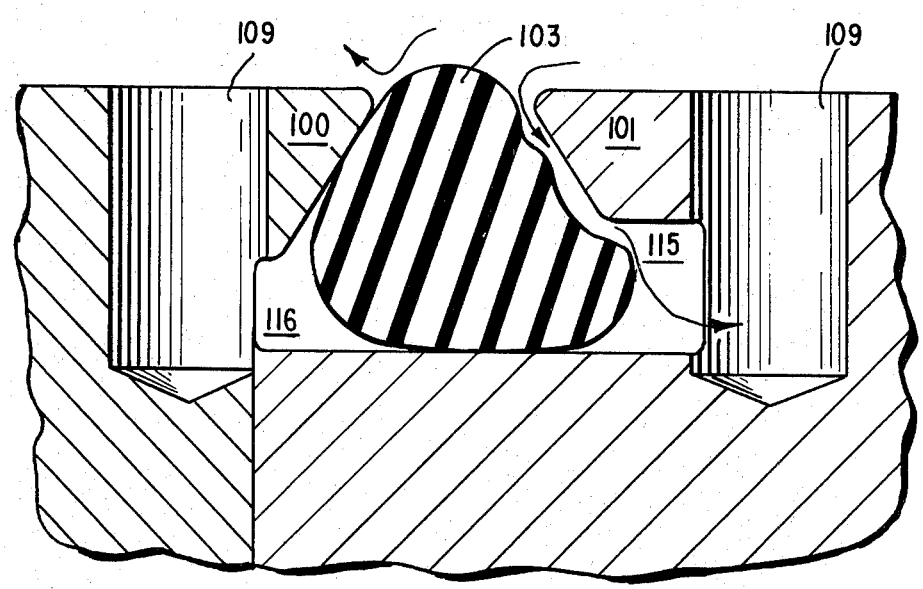
FIG. 4 is a detailed cross-section of the novel main valve seal of the invention showing the features of seal retention in the cross-section.

The turbulence produced by this flow includes a substantial vortex formation adjacent to the seal 103 (re. FIG. 4) partially retained in a generally triangular groove defined by an orifice seat 100 and orifice insert 101. The orifice insert 101 is removably mounted in the main valve 7 by threads or other means and may be removed for servicing or replaced with a different size insert to change the flow capacity of the main valve 7. The groove is asymmetric in cross section with a cavity 115 on the inside diameter side larger than a cavity 116 on the outside diameter side to allow for thermal expansion of the seal 103. The groove is of a size, however, to extrude the seal 103 outward to engage the piston 69 in the valve closed position. Under these conditions the low pressures produced by the above mentioned vortices would result in the gases trapped in a seal cavity 116 defined within the triangular groove and around the seal 103, forcing the seal 103 out of the triangular seal cavity or groove past the orifice seat and insert 100 and 101. Utilization of a plurality of vent apertures 109, as shown, however, adjacent to both the orifice seat 100 and insert 101, allow the gas from the cavities 115 and 116 to vent, thereby eliminating the tendency to dislodge the seal member 103. In this manner, a relatively simple and easy to manufacture seal, such as an "O" ring can be used. In addition, through the employment of the disclosed construction the seal member 103 is out of the flow direction thereby avoiding direct impingement by abrasive particles.

The seal construction described above has been found to be highly effective in valves having piston 69 diameters as large as 8 inches and pressures as high as 2220 pounds per square inch. The method allows the relatively simple construction complying at the most tool removable components to provide a reliable and lasting seal for a large capacity relief valve, since the seal 103 is positioned out of the turbulence of the flow of the product while still insuring an efficient seal.

Thus, it is apparent that there has been provided in accordance with the invention a pilot operated relief valve utilizing a two-stage non-flow pilot and improved main valve which fully satisfies the objects, aims and advantages set forth above.

While the invention has been described in connection with specific configuration and component embodiments, it is evident that many alternatives, modifications, and variations will be apparent to those skilled in the art in light of the foregoing description. Accordingly, it is intended to embrace all such alternatives, modifications, and variations as fall within the spirit and scope of the following claims.

I claim:

1. A pilot operated pressure relief valve having a housing, a reciprocating shut-off member in said housing defining first and second pressurized volumes above and below the shut-off member, respectively, comprising;

a first aperture communicating with said first volume;
second aperture communicating with said second volume, and defining an orifice;
an orifice insert concentric with said orifice, and an orifice seat secured to said housing, said orifice insert mounted on said orifice seat, said orifice insert and said orifice seat defining first and second sides, respectively, of a seal retention groove;
said orifice insert and said orifice seat defining a planar surface facing said shut-off member;
a seal in said goove, said seal and said groove defining a valve seat for said shut-off member;
a first plurality of apertures communicating with said first side of said seal retention groove in spaced relationship in the periphery of said orifice insert, said first plurality of apertures terminating in said planar surface and communicating with said second volume;

a second plurality of apertures communicating with the second side of said seal retention groove in spaced relation in the periphery of said orifice seat, said second plurality of apertures terminating in said planar surface and communicating with said second volume;

means seating said seal on said closure member;

means maintaining said closure member in sealing engagement with said seal for equal pressure in said volumes; and means selectively venting said first volume, wherein said product pressure displaces said shut-off member from said seat, and increased pressure in said seal groove beneath said seal caused by product flow through said orifice is relieved by said apertures.

2. The valve claimed in claim 1 wherein said orifice insert is removable.

3. The valve claimed in claim 1 wherein said seal retention groove is asymmetrical.

4. The valve claimed in claim 1 wherein said seal retention groove is triangular.

* * * * *